U S010852066B2

(12) United States Patent
Faure et al.

(10) Patent No.: US 10,852,066 B2
(45) Date of Patent: Dec. 1, 2020

(54) EXCHANGER-REACTOR COMPRISING CONNECTORS WITH SUPPORTS

(71) Applicant: L'Air Liquide, Société Anonyme pour l'Etude et l'Exploitation des Procédés Georges Claude, Paris (FR)

(72) Inventors: Raphaël Faure, Saint Rémy les Chevreuse (FR); Olivier Dubet, Buc (FR); Pascal Del Gallo, Douran (FR); Matthieu Flin, Vanves (FR)

(73) Assignee: L'Air Liquide, Société Anonyme pour l'Etude at l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 16/469,371

(22) PCT Filed: Nov. 23, 2017

(86) PCT No.: PCT/FR2017/053228
§ 371 (c)(1),
(2) Date: Jun. 13, 2019

(87) PCT Pub. No.: WO2018/109299
PCT Pub. Date: Jun. 21, 2018

(65) Prior Publication Data
US 2019/0310022 A1 Oct. 10, 2019

(30) Foreign Application Priority Data
Dec. 15, 2016 (FR) ...................................... 16 62479

(51) Int. Cl.
*F28C 3/02* (2006.01)
*B01J 19/24* (2006.01)
(Continued)

(52) U.S. Cl.
CPC ............... *F28C 3/02* (2013.01); *B01J 19/249* (2013.01); *F28F 7/02* (2013.01); *B01J 2219/246* (2013.01);
(Continued)

(58) Field of Classification Search
CPC .............. B01J 19/249; B01J 2219/2453; B01J 2219/2458; B01J 2219/246;
(Continued)

(56) References Cited

U.S. PATENT DOCUMENTS

| 5,765,631 A  | * | 6/1998 | Gerard ................... B01D 1/065 165/111 |
| 6,189,338 B1 | * | 2/2001 | Lehman ............... B01D 5/0015 165/111 |
| 2018/0170750 A1 | | 6/2018 | Del-Gallo et al. |

FOREIGN PATENT DOCUMENTS

| EP | 3 015 166 | 5/2016 |
| WO | WO 2011 148067 | 12/2011 |
| WO | WO 2016 128647 | 8/2016 |

OTHER PUBLICATIONS

Written Opinion for corresponding PCT/FR2017/053228, datd Feb. 16, 2018.
(Continued)

*Primary Examiner* — Anthony J Zimmer
*Assistant Examiner* — Syed T Iqbal
(74) *Attorney, Agent, or Firm* — Elwood L. Haynes

(57) ABSTRACT

A single-component exchanger-reactor including, from bottom to top in the direction of manufacture a distribution region, an inlet connector and an outlet connector, each in the form of a half cylinder and adjoining the distribution region on either side; an inlet located on the front face of the inlet connector, an outlet located on the front face of the outlet connector; an exchange region consisting of reactive
(Continued)

channels and product channels; with each connector including supports in the inner upper part thereof.

8 Claims, 5 Drawing Sheets

(51) Int. Cl.
  *F28F 7/02* (2006.01)
  *B33Y 80/00* (2015.01)
  *B22F 3/105* (2006.01)
  *F28D 21/00* (2006.01)

(52) U.S. Cl.
  CPC .......................... *B01J 2219/2453* (2013.01); *B01J 2219/2458* (2013.01); *B01J 2219/2462* (2013.01); *B01J 2219/2479* (2013.01); *B01J 2219/2497* (2013.01); *B22F 3/1055* (2013.01); *B33Y 80/00* (2014.12); *F28D 2021/0022* (2013.01); *F28F 2255/18* (2013.01); *Y02P 10/295* (2015.11)

(58) Field of Classification Search
  CPC ........ B01J 2219/2462; B01J 2219/2479; B01J 2219/2497; B22F 3/1055; B33Y 80/00; F28C 3/02; F28D 2021/0022; F28F 2255/18; F28F 7/02; Y02P 10/295
  See application file for complete search history.

(56) References Cited

OTHER PUBLICATIONS

International Search Report for corresponding PCT/FR2017/053228, dated Feb. 16, 2018.

\* cited by examiner

EXCHANGER-REACTOR COMPRISING CONNECTORS WITH SUPPORTS

CROSS REFERENCE TO RELATED APPLICATIONS

This application is a 371 of International PCT Application No. PCT/FR2017/053228, filed Nov. 23, 2017, which claims priority to French Patent Application No. 1662479, filed Dec. 15, 2016, the entire contents of which are incorporated herein by reference.

BACKGROUND

The present invention relates to single-component millistructured exchanger-reactors, that is to say those having no assembly interface.

Currently, the most widespread method for the production of syngas is steam reforming of methane. This reaction is catalytic and endothermic. The heat necessary for the reaction is obtained by combustion in a radiative furnace. Thus, the syngas is obtained at high temperature (approximately 900° C.). An already widespread optimization proposes carrying out the reaction in a millistructured exchanger-reactor in order to improve the transfers of heat and of material within the reactor.

SUMMARY

A solution of the present invention is a single-component exchanger-reactor comprising, from bottom to top in the direction of manufacture:
  a distribution region 3;
  an inlet connector 11 and an outlet connector 12, each in the form of a half cylinder and adjoining the distribution region on either side;
  an inlet 1 located on the front face of the inlet connector;
  an outlet 2 located on the front face of the outlet connector;
  an exchange region consisting of reactive channels 5 and product channels 6;
with each connector comprising supports in the inner upper part thereof.

It is to be noted that the channels in question are millimeter-scale channels.

Depending on the case, the reactor-exchanger according to the invention can exhibit one or more of the following features:
  the distribution region comprises, on its face adjoining the inlet connector, flow inlets arranged on several vertical axes; the supports included in the inner upper part of the inlet connector have one face adjoining the distribution region and one face adjoining the inner upper face of the inlet connector; and the supports are interposed between said various vertical axes;
  the distribution region comprises, on its face adjoining the outlet connector, flow outlets arranged on several vertical axes; the supports included in the inner upper part of the outlet connector have one face adjoining the distribution region and one face adjoining the inner upper face of the output connector, and the supports are interposed between said various vertical axes;
  the supports are in the shape of a sector of a disk having an angle of between 30 and 60°, preferably between 40 and 50°;
  the connectors have an internal diameter "D" and the supports in the shape of a sector of a disk have a radius "d" such that $$\frac{1}{4}D \leq d \leq \frac{1}{3}D;$$

the supports have a porosity of between 25 and 45%, preferably a porosity of between 35% and 45%;
  the supports have a thickness of less than 2 mm, preferably less than 1 mm, more preferably less than 0.8 mm;
  the flow inlets and/or flow outlets of the distribution region have a hydraulic diameter of between 0.3 and 4 mm, preferably 0.5 and 2 mm;
  said exchanger-reactor is manufactured in one piece by additive manufacturing.

For preference, the additive manufacturing method uses as its base material at least one micrometer-scale metal powder.

The channels of the exchange region are spread over several stages. "Stage" is to be understood as a set of channels located at the same level. The channels are separated by walls. "Wall" is to be understood as a separating partition between two consecutive channels. The number of channels, their dimensions and their arrangements are determined so as to be able to achieve the expected performance in terms of heat transfer, loss of feedstock and conversion.

Three types of stage may be defined, depending on the fluid circulating in the channels of that stage:
  Those stages comprising so-called "reactive" channels in which there circulates generally, in the case of steam reforming, a mixture of hydrocarbon feedstock and steam,
  Those stages comprising so-called "product" channels in which circulate the products of the steam reforming reaction. The products of the steam reforming reaction give up, to the mixture of hydrocarbon feedstock and steam, part of the heat required for the steam reforming reaction, thus making it possible to improve the efficiency of the process,
  Those stages comprising so-called "heat supply" channels in which there circulates a heat transfer fluid, such that it is possible to supply the heat required for the steam reforming reaction.

An exchanger-reactor consists of a stack of these three types of stages.

The flows are conveyed in the channels via a region termed the distribution region. The distribution region permits even distribution of the flows between the channels that are accessible to it.

The additive manufacturing process can use micrometer-scale metal powders which are melted by one or more lasers so as to manufacture finished parts having complex three-dimensional shapes. The part is built up layer by layer, the layers are of the order of 50 µm, depending on the precision of the desired shapes and the desired deposition rate. The metal that is to be melted can be supplied either by a powder bed or by a spray nozzle. The lasers used to locally melt the powder are YAG, fiber or CO2 lasers, and the powder is melted under an inert atmosphere (argon, helium, etc.). The present invention is not restricted to a single additive manufacturing technique, but applies to all known techniques.

Additive manufacturing techniques make it possible ultimately to produce parts that are said to be "solid" and which, in contrast to construction techniques such as diffusion brazing or diffusion welding, have no construction interface between each engraved plate. This property increases the mechanical strength of the device, since the way in which the device is built eliminates weakening lines and thus eliminates a source of potential defects.

The production of solid part by additive manufacturing, and the elimination of diffusion brazing or welding interfaces, makes it possible to conceive of numerous design possibilities without being limited to wall geometries that have been studied in order to limit the impact of possible construction defects such as discontinuities in the brazed joins or in the diffusion welded interfaces.

Additive manufacturing makes it possible to produce shapes that would be inconceivable with traditional manufacturing methods, and thus the manufacture of the connectors of the exchanger-reactors or millistructured exchangers can be performed in continuation of the manufacture of the body of the devices. This then makes it possible to not carry out an operation of welding the connectors to the body, and hence makes it possible to eliminate a source of weakening of the structural integrity of the equipment.

The supports in the inner upper part of the connectors make it possible to manufacture the connectors of the exchanger-reactor by means of an additive method.

The supports must be positioned in the connectors at those points where the manufacture by an additive method will require support. For example in the case of an exchanger-reactor constructed vertically by an additive method, as shown in FIG. 2.

The supports of the connectors are located in the inner upper part of the connectors.

In order to minimize the impact on the manufacturing method, and to not disturb the circulation of the flows and their distribution at the flow inlets and outlets of the distribution region, the supports are positioned between the inlets and outlets, which dictates their thickness (see FIGS. 3, 4 and 5).

Moreover, so as to not disturb the circulation of the flows, the supports are preferably perforated and have a high porosity of between 25 and 45%, with an ideal value of 40% (calculated as the ratio of the combined volume of the holes of the supports to the total volume occupied by a support).

The present invention also relates to a process for steam reforming a hydrocarbon feedstock, using a reactor-exchanger according to the invention. It is to be noted that the performance of the exchanger-reactor, and hence the proper execution of the steam reforming process, are not impaired by the presence of supports.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
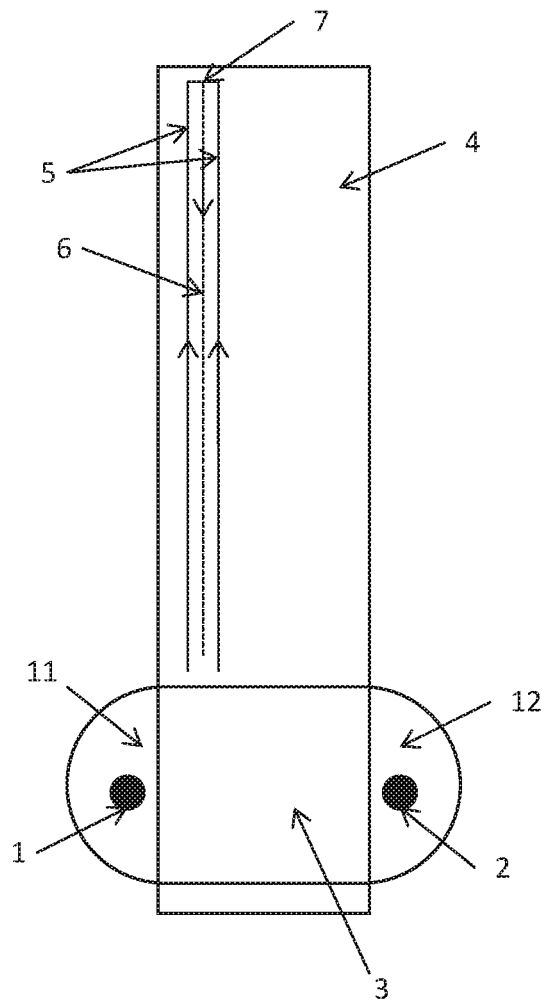
FIG. 1 illustrates a schematic representation of one embodiment of the current invention.
Figure 2:
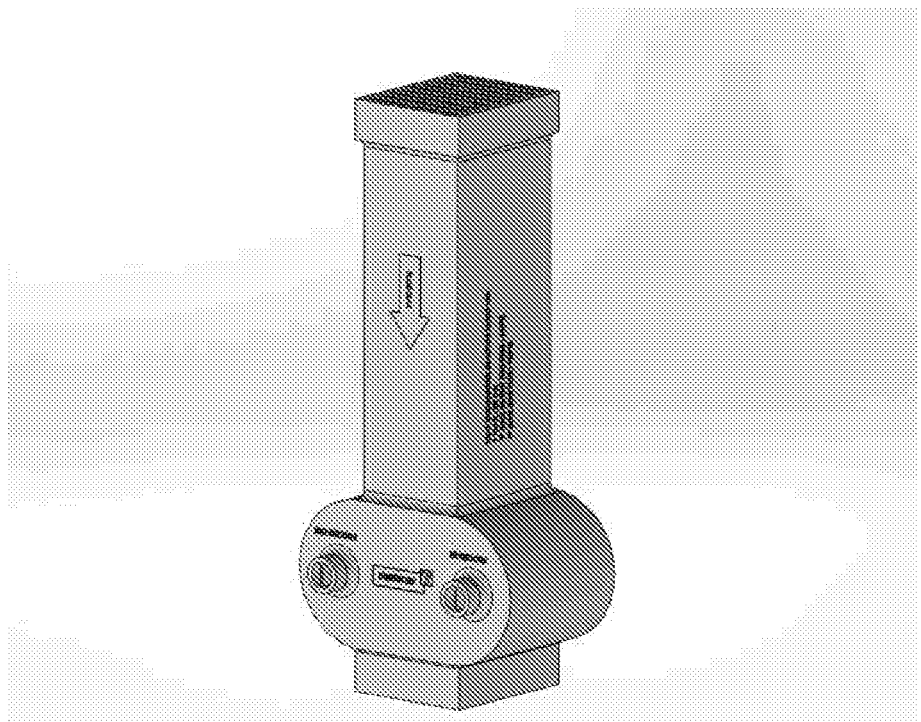
FIG. 2 illustrates a schematic representation of another embodiment of the current invention.
Figure 3:
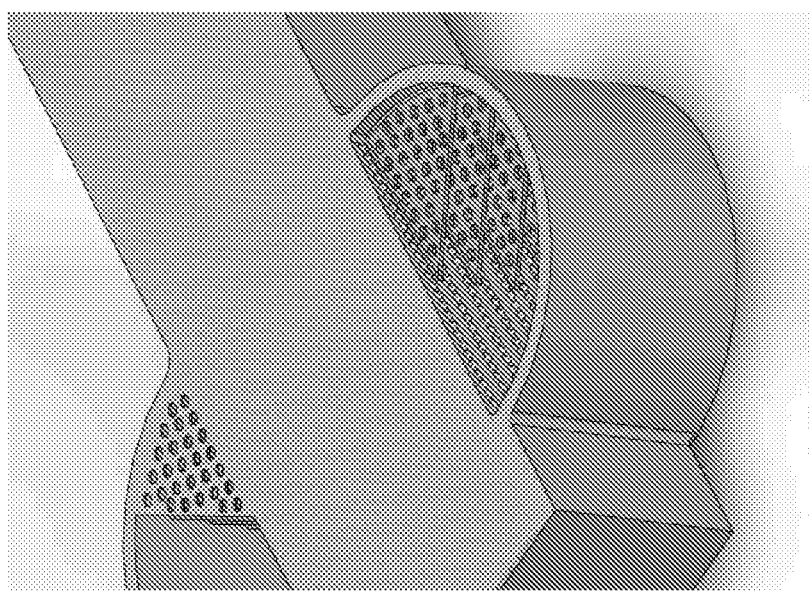
FIG. 3 illustrates a schematic representation of another embodiment of the current invention.
Figure 4:
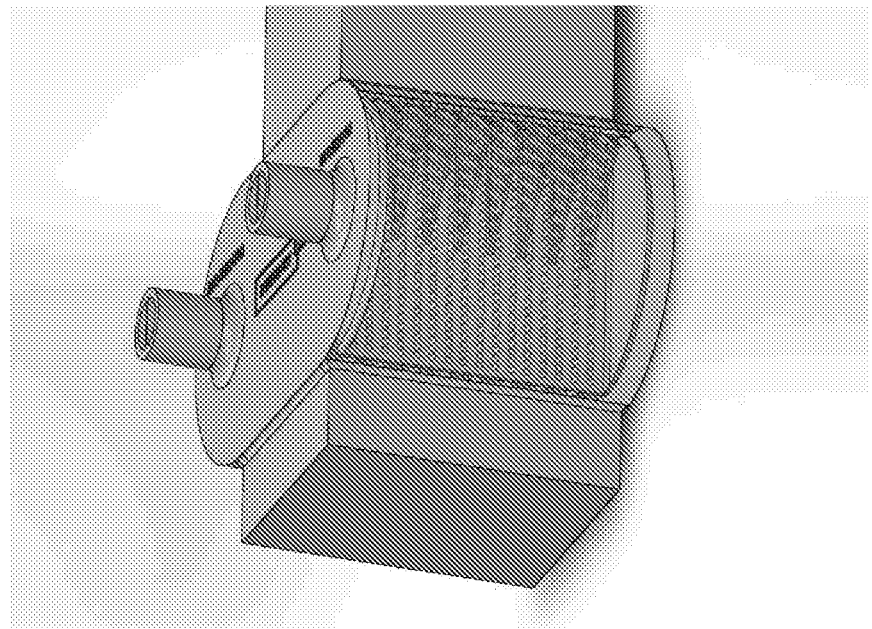
FIG. 4 illustrates a schematic representation of another embodiment of the current invention.
Figure 5:
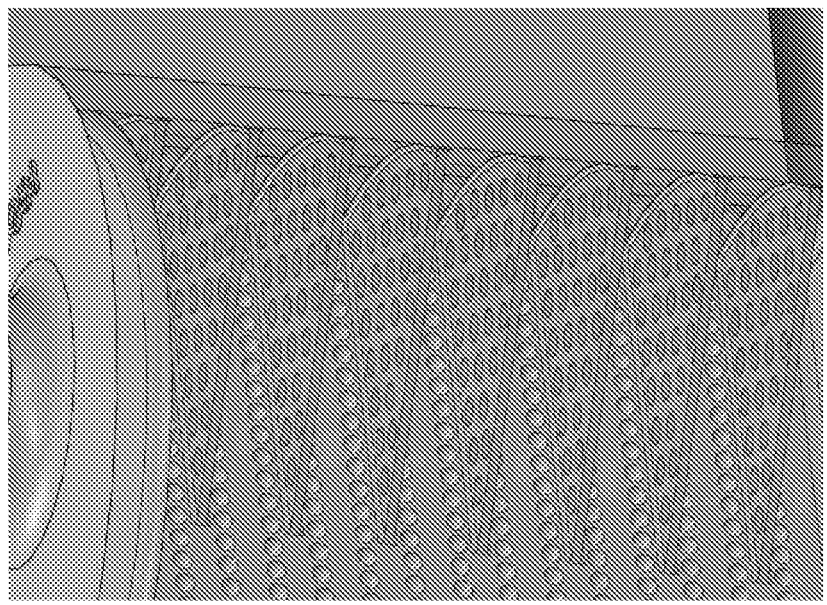
FIG. 5 illustrates a schematic representation of another embodiment of the current invention.

The reforming reactor to which this invention relates is a single-component unit consisting of various parts, which are shown in FIG. 1. A "single-component reactor" is to be understood as a reactor having no assembly interface. The inlet 1 and the outlet 2 of the exchanger-reactor are respectively connected to an inlet connector 11 and an outlet connector 12, which are themselves directly connected to the distribution region 3 which supplies the exchange region 4. The exchange region 4 consists of straight and parallel channels: these straight channels are divided into the reactive channels 5, the product channels 6 and the junctions 7 between two reactive channels 5 and a product channel. The "reactive channels" are to be understood as those channels in which a catalytic reaction takes place, and the "product channels" as those channels in which the product flow can circulate. Only the inlet 1, the distribution region 3 and the reactive 6 channels 5 are coated with a catalyst 8. In addition to the deposit of catalyst 8, these channels may also be coated with a cladding for protection against corrosion 9, applied to the surface 10 of the reactive channels.

The inlet connector 11 and outlet connector 12 may be defined as a volume that is at least 50% empty, preferably at least 70% empty, and that respectively connects the inlet and the distribution region, and the distribution region and the outlet.

The "distribution region" is to be understood as a volume that is arranged so as to best distribute the flows entering or leaving the channels of the exchange region.

In order to allow the single-stage manufacture of an exchanger-reactor as described above, it is necessary for the inlet connector and outlet connector to be manufactured by an additive method at the same time as the distribution region and the exchange region.

However, without limiting the positioning or size possibilities of the connectors, there is currently no solution which permits the manufacture of the connectors at the same time as the exchange region and the distribution region.

Hence, there is a need to provide an improved exchange-reactor and/or an improved process with which it is possible to manufacture the connectors at the same time as the exchange region and the distribution region.

EXAMPLES

The examples below aim to show the importance of the supports during manufacture of an exchanger-reactor by means of an additive method.

Example According to the Invention

Consider the example of a reactor-exchanger made of Inconel 625 for the production of 5 Nm3/h (pilot case) of hydrogen intended to be supplied to a fuel cell in order to produce electricity and hot water for a dwelling. The connectors of the exchanger-reactor may have a diameter of between 15 mm and 150 mm. A diameter of 80 mm is chosen.

Figure 6:
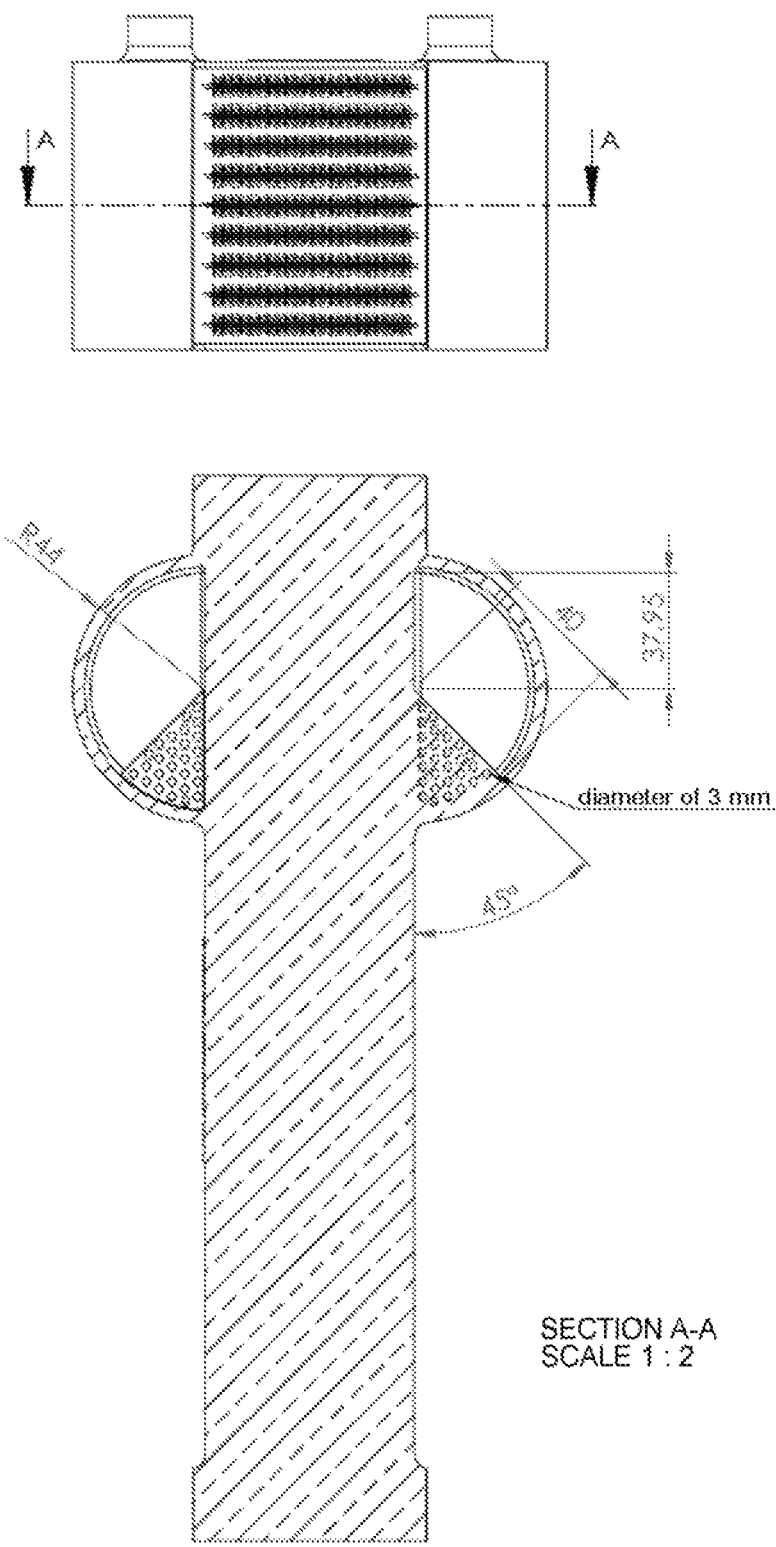
FIG. 6 illustrates a schematic representation of another embodiment of the current invention.

The presence of supports makes it possible to obtain the exchanger-reactor depicted in FIG. 6.

Comparative Example

For the manufacture of this exchanger-reactor, the features of the exchanger-reactor according to the invention are retained, with the exception of the supports which are eliminated.

Figure 7:
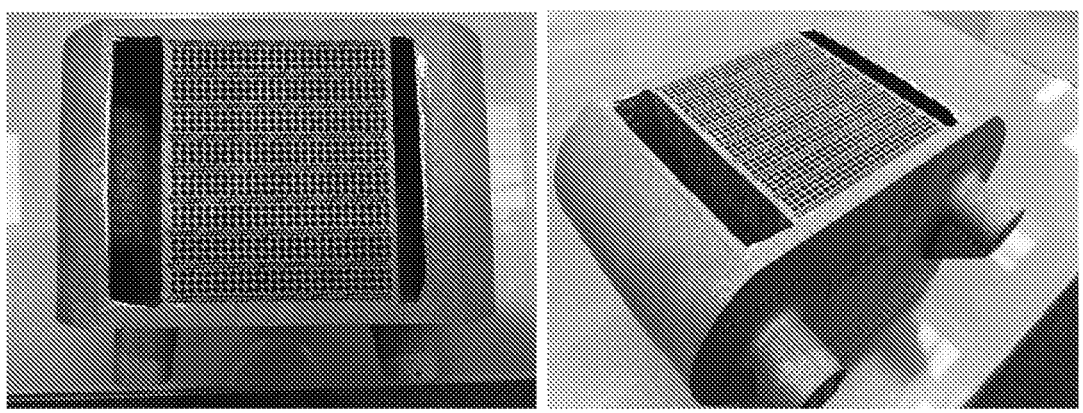
FIG. 7 illustrates a schematic representation of another embodiment of the current invention.

The absence of supports results in the exchanger-reactor depicted in FIG. 7.

In other words, without the supports it proves impossible to close the inlet and outlet connectors 11 and 12 during manufacture of the exchanger-reactor by an additive method, as a result of which the exchanger-reactor is rejected.

In order to be able to vertically construct, by 3D printing, an exchanger-reactor as previously described, and thus maximize the exchange length that can be created in the 3D printing machine, it is necessary to provide, in the inlet and outlet connectors, specific supports which will remain in place once the part has been produced, and which must therefore produce minimum disturbance of the flow of the fluids once the part is in operation. Without these supports, and with it being necessary to supply/remove one or more fluids from one of the lateral faces, it is necessary to provide specific, highly perforated supports, as defined in the present application.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A single-component exchanger-reactor comprising, a bottom and a top, the exchanger-reactor comprising from bottom to top in the direction of manufacture:
   a distribution region;
   an inlet connector and an outlet connector, each in the form of a half cylinder and adjoining the distribution region on either side;
   an inlet located on a front face of the inlet connector;
   an outlet located on the front face of the outlet connector;
   an exchange region consisting of reactive channels and product channels;
   with each connector comprising supports in the inner upper part thereof,
   wherein the supports have a porosity of between 25 and 45%.

2. The exchanger-reactor as claimed in claim 1, wherein the distribution region comprises, on a face adjoining the inlet connector, flow inlets arranged on several vertical axes;
   the supports included in the inner upper part of the inlet connector have one face adjoining the distribution region and one face adjoining the inner upper face of the inlet connector; and
   the supports are interposed between said various vertical axes.

3. The exchanger-reactor as claimed in claim 1, wherein:
   the distribution region comprises, on a face adjoining the outlet connector, flow outlets arranged on several vertical axes;
   the supports included in the inner upper part of the outlet connector have one face adjoining the distribution region and one face adjoining an inner upper face of the outlet connector; and
   the supports are interposed between said various vertical axes.

4. The exchanger-reactor as claimed in claim 1, wherein the supports are in the shape of a sector of a disk having an angle of between 30 and 60°.

5. The exchanger-reactor as claimed in claim 4, wherein the connectors have an internal diameter "D" and the supports in the shape of a sector of a disk have a radius "d" such that $$\frac{1}{4}D \le d \le \frac{1}{3}D.$$

6. The exchanger-reactor as claimed in claim 1, wherein the supports have a thickness of less than 2 mm.

7. The exchanger-reactor as claimed in claim 1, wherein the flow inlets and/or flow outlets of the distribution region have a hydraulic diameter of between 0.3 and 4 mm.

8. The exchanger-reactor as claimed in claim 1, wherein the exchanger-reactor is manufactured in one piece by additive manufacturing.

* * * * *